(12) United States Patent
Liu et al.

(10) Patent No.: US 11,650,456 B2
(45) Date of Patent: May 16, 2023

(54) DISPLAY DEVICE HAVING A PRIVACY DISPLAY MODE AND A NORMAL DISPLAY MODE

(71) Applicant: CHAMP VISION DISPLAY INC., Miao-Li County (TW)

(72) Inventors: Chin-Ku Liu, Miao-Li County (TW); Chung-Hao Wu, Miao-Li County (TW); Hsin-Hung Lee, Miao-Li County (TW); Chun-Chien Liao, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 17/960,787

(22) Filed: Oct. 5, 2022

(65) Prior Publication Data

US 2023/0107706 A1 Apr. 6, 2023

(30) Foreign Application Priority Data

Oct. 6, 2021 (TW) .................................. 110211735

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133626* (2021.01)

(58) Field of Classification Search
CPC ......... G02F 1/133603; G02F 1/133605; G02F 1/133626
See application file for complete search history.

(56) References Cited

FOREIGN PATENT DOCUMENTS

| CN | 105911746 | | 8/2016 |
|---|---|---|---|
| CN | 206057756 U | * | 3/2017 |
| TW | 201533607 | | 9/2015 |
| TW | I573123 | | 3/2017 |

* cited by examiner

*Primary Examiner* — Karabi Guharay
(74) *Attorney, Agent, or Firm* — JCIPRNET

(57) ABSTRACT

A display device, including a display module and a peep-proof light source module, is provided. The display module is used to provide a display beam. The peep-proof light source module is disposed on a transmission path of the display beam and includes at least one light emitting element, a light guide plate, and optical microstructures. The light emitting element is used to provide a privacy light. The light guide plate has at least one light incident surface. Each optical microstructure has an optical surface facing the light incident surface. At least part of the privacy light is reflected by the optical surface and then exits the light guide plate. The distribution density of the optical microstructures on the light guide plate close to the light incident surface is substantially the same as the distribution density away from the light incident surface and close to the center.

9 Claims, 12 Drawing Sheets

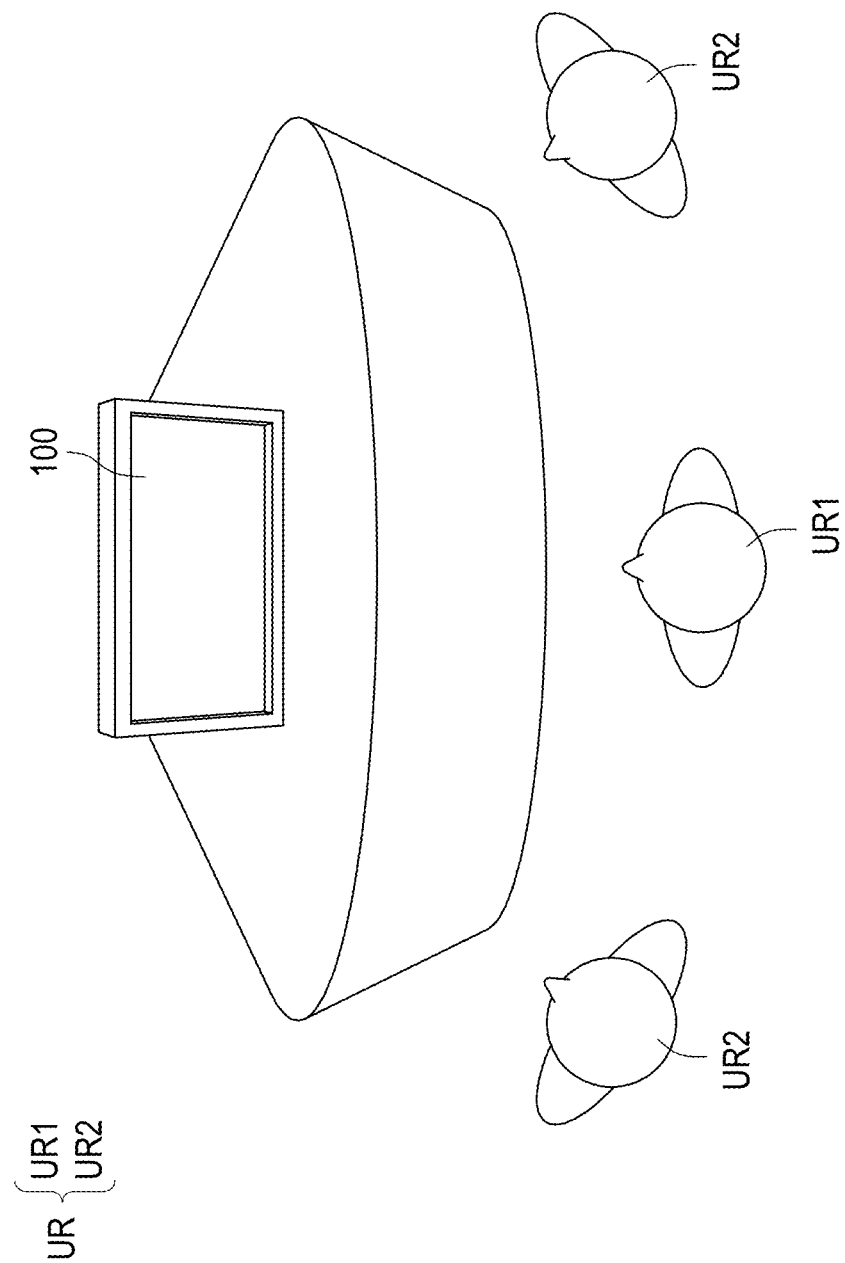

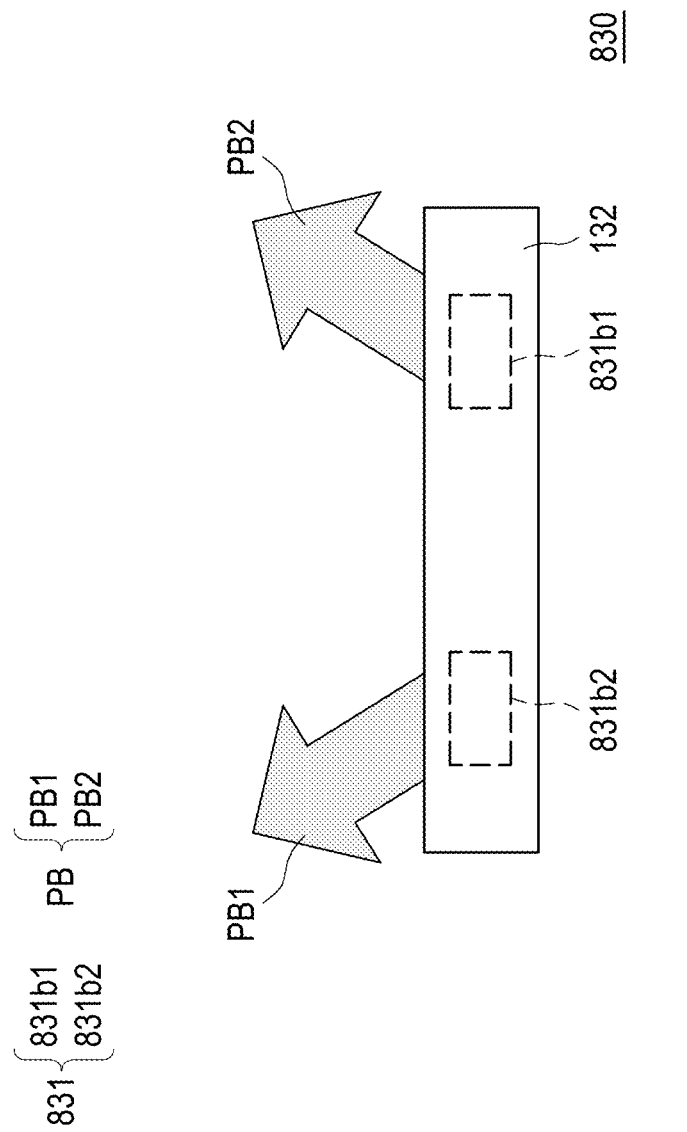

DISPLAY DEVICE HAVING A PRIVACY DISPLAY MODE AND A NORMAL DISPLAY MODE

CROSS-REFERENCE TO RELATED APPLICATION

This application claims the priority benefit of Taiwan application serial no. 110211735, filed on Oct. 6, 2021. The entirety of the above-mentioned patent application is hereby incorporated by reference herein and made a part of this specification.

BACKGROUND

Technical Field

The disclosure relates to an optical device, and particularly relates to a display device.

Description of Related Art

With the development of science and technology, display devices have become common electronic devices in daily life. At present, some display devices will provide a privacy function, and the application scope thereof also ranges from notebook computers and liquid crystal display monitors to portable consumer audio-visual products, such as mobile phones and tablets. However, since the light-emitting angle of the backlight module in the display device is limited by the design of the optical film and cannot be easily changed and replaced, the general privacy function is implemented through adding a peep-proof optical sheet or a peep-proof optical module to mask the large-angle light beams provided by the display device, so as to avoid being viewed by others.

For example, there are two currently known peep-proof display technologies for display devices. One is to add a peep-proof optical sheet composed of many ultra-fine louvre structures like shutters to the display screen. In this way, when the light passes through the many fine louvres, the light beams on the left and right viewing angles are blocked by the louvres, so that the user can only see normally within about 60 degrees from the front, while others nearby can only see dark images due to the rays being blocked. However, in this way, the brightness of the front-view image will also become darker while the sharpness of the image will also decrease. In addition, the peep-proof optical sheet is relatively inconvenient to carry, and the configuration thereof also affects the images and undermines the aesthetics of the exterior design of the original screen.

The other is to add a peep-proof optical module composed of a liquid crystal viewing angle switcher to the display device. The liquid crystal viewing angle switcher changes the polarization state of rays passing through by switching the state of liquid crystal, so that the rays exiting the liquid crystal viewing angle switcher from different angles have different transmittance relative to a polarizing plate, so that the observer sees different image brightness at different angles. In this way (different regional brightness distribution), the user at the front viewing angle to use the handphone normally, and the onlookers are interfered by dark image, thereby achieving the objective of peep-proofing. However, when the privacy function is turned on, for the user at the front viewing angle, the image brightness is slightly decreased and the entire image is whitish, as if looking at the handphone through a layer of chiffon, which affects the contrast and display quality of the image. Moreover, such peep-proof technology can only interfere with the onlookers viewing the images, but cannot completely mask the images.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a display device with a privacy function and good image quality.

The other objectives and advantages of the invention may be further understood from the technical features disclosed in the disclosure.

In order to achieve one, part, or all of the above objectives or other objectives, an embodiment of the disclosure provides a display device capable of switching between a privacy display mode and a normal display mode. The display device includes a display module and a peep-proof light source module. The display module is used to provide a display beam. The peep-proof light source module is configured on a transmission path of the display beam. The peep-proof light source module includes at least one light emitting element, a light guide plate, and multiple optical microstructures. The at least one light emitting element is used to provide a privacy light. The light guide plate has at least one light incident surface and a first surface and a second surface opposite to each other. The at least one light incident surface connects the first surface and the second surface. The optical microstructures are disposed on the first surface. Each of the optical microstructures has an optical surface. The optical surface faces the light incident surface. At least part of the privacy light is reflected by the optical surface and then exits the light guide plate. A distribution density of the optical microstructures on the light guide plate close to the at least one light incident surface is substantially the same as the distribution density on the light guide plate away from the at least one light incident surface and close to a center. There is a first included angle between the optical surface of each of the optical microstructures and the first surface, and a range of the first included angle is between 10 degrees and 60 degrees.

In an embodiment of the disclosure, the optical surface of each of the optical microstructures includes multiple sub-optical surfaces. There is a first sub-included angle between each of the sub-optical surfaces and the first surface. In the first sub-included angle of each of the sub-optical surfaces, the first sub-included angle of the sub-optical surface further from the first surface is greater than the first sub-included angle of the sub-optical surface closer to the first surface.

In an embodiment of the disclosure, the optical microstructures are elongated concave microstructures, concave conical microstructures, elongated convex microstructures, or convex conical microstructures.

In an embodiment of the disclosure, the at least one light emitting element includes a first light emitting element and a second light emitting element. The privacy light includes a first privacy light and a second privacy light respectively provided by the first light emitting element and the second light emitting element. The at least one light incident surface includes a first light incident surface and a second light incident surface. The first light incident surface and the second light incident surface are opposite to each other. The first privacy light enters the light guide plate through the first light incident surface, and the second privacy light enters the light guide plate through the second light incident surface.

In an embodiment of the disclosure, the optical microstructures are elongated concave microstructures. The optical surface of each of the optical microstructures includes a first optical surface and a second optical surface. The first optical surface faces the first light incident surface, and at least part of the first privacy light is reflected by the first optical surface and then exits. The second optical surface faces the second light incident surface, and at least part of the second privacy light is reflected by the second optical surface and then exits.

In an embodiment of the disclosure, the first privacy light and the second privacy light respectively exit from two sides of a normal of a light-exiting surface of the light guide plate, and on the light-exiting surface, a light-exiting angle of the first privacy light exiting the light guide plate is between −20 degrees and −90 degrees, and a light-exiting angle of the second privacy light exiting the light guide plate is between 20 degrees and 90 degrees.

In an embodiment of the disclosure, in the privacy display mode, the display device provides the display beam and the privacy light at a same time. In the normal display mode, the display device only provides the display beam. In the privacy display mode, a luminous flux of the privacy light exiting the light guide plate at a light-exiting angle of 30 degrees is more than twice a luminous flux of the display beam at a light-exiting angle of 30 degrees.

In order to achieve one, part, or all of the above objectives or other objectives, an embodiment of the disclosure provides a display device capable of switching between a privacy display mode and a normal display mode. The display device includes a display module and a peep-proof light source module. The display module is used to provide a display beam. The peep-proof light source module is configured on a transmission path of the display beam. The peep-proof light source module includes multiple light emitting elements, a light guide plate, and multiple optical microstructures. The light emitting elements are used to provide multiple privacy lights and are located on a same side of the light guide plate. The light guide plate has a light incident surface and a first surface and a second surface opposite to each other. The light incident surface connects the first surface and the second surface. The optical microstructures are disposed on the first surface. Each of the optical microstructures has an optical surface. The optical surface faces the light incident surface. At least part of the privacy light is reflected by the optical surface and then exits the light guide plate.

In an embodiment of the disclosure, the optical microstructures include multiple optical microstructure groups, arrangement directions of the optical microstructure groups are different, a perpendicular bisector of each of the optical microstructure groups intersects at a reference point, and positions of the reference point and the light emitting elements do not overlap.

Based on the above, the embodiments of the disclosure have at least one of the following advantages or effects. In the embodiments of the disclosure, through the configuration of the optical microstructures of the peep-proof light source module, the display device in the privacy display mode, at least part of the privacy light to suffer total internal reflection at the optical surface and then exit the light guide plate at a large viewing angle, so that the onlooking user will see an approximately all white image due to the presence of the privacy light with high brightness, which can achieve the privacy function. In addition, since the light-exiting angle of the privacy light does not include the front viewing angle (in the direction overlapping with the normal perpendicular to the light-exiting surface), the viewing quality of the user viewing the display image from the front viewing angle is not affected. In this way, the display device can not only provide the privacy function, but also provide good image quality for the user viewing from the front viewing angle.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A and FIG. 2B are respectively schematic views of viewing scenarios of a user when the display device is in the privacy display mode and the normal display mode.

FIG. 9 is a schematic view of the peep-proof light source module of FIG. 8 when a privacy light exits.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
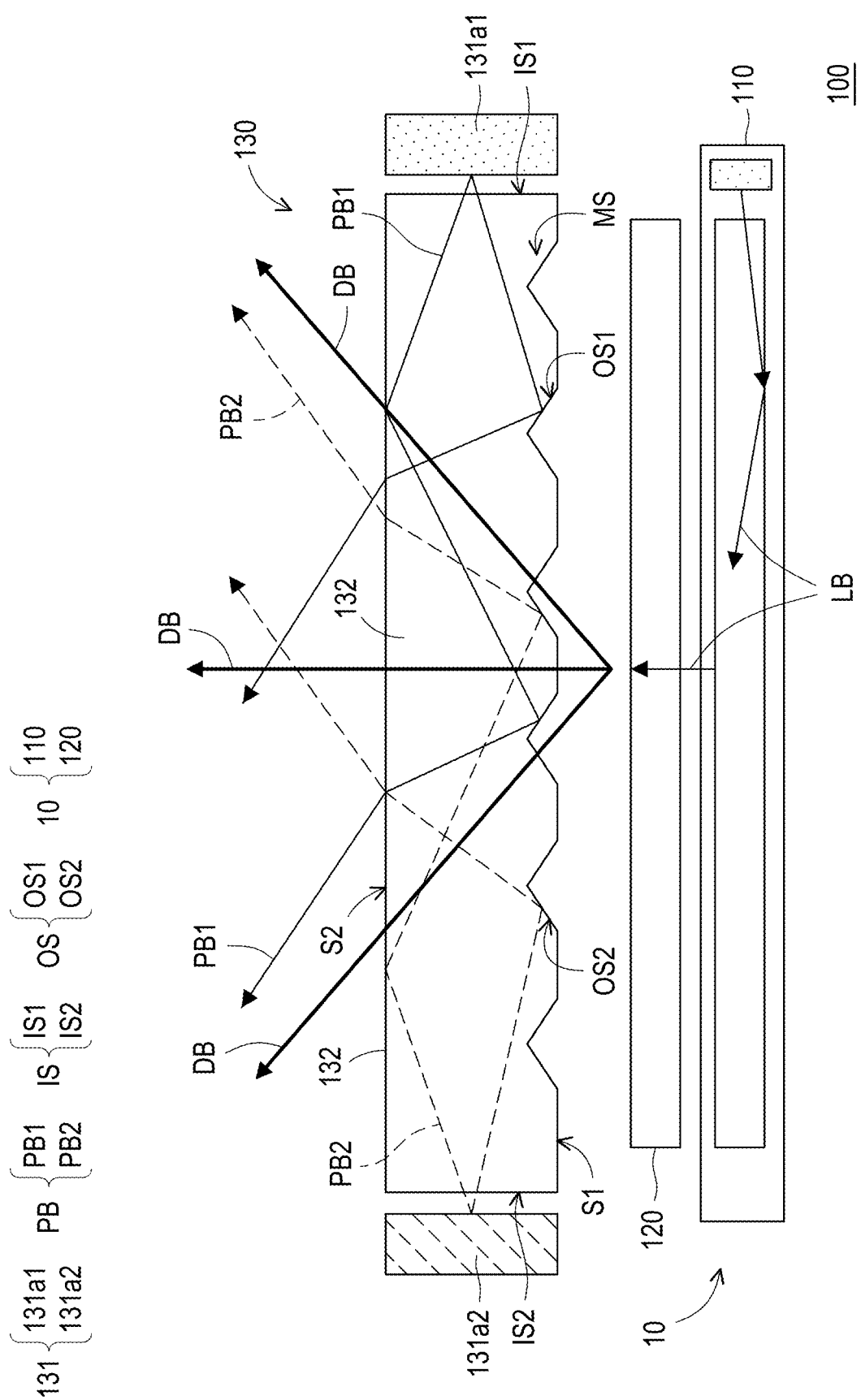
FIG. 1A is a schematic view of a light path of a display device in a privacy display mode according to an embodiment of the disclosure.
Figure 1B:
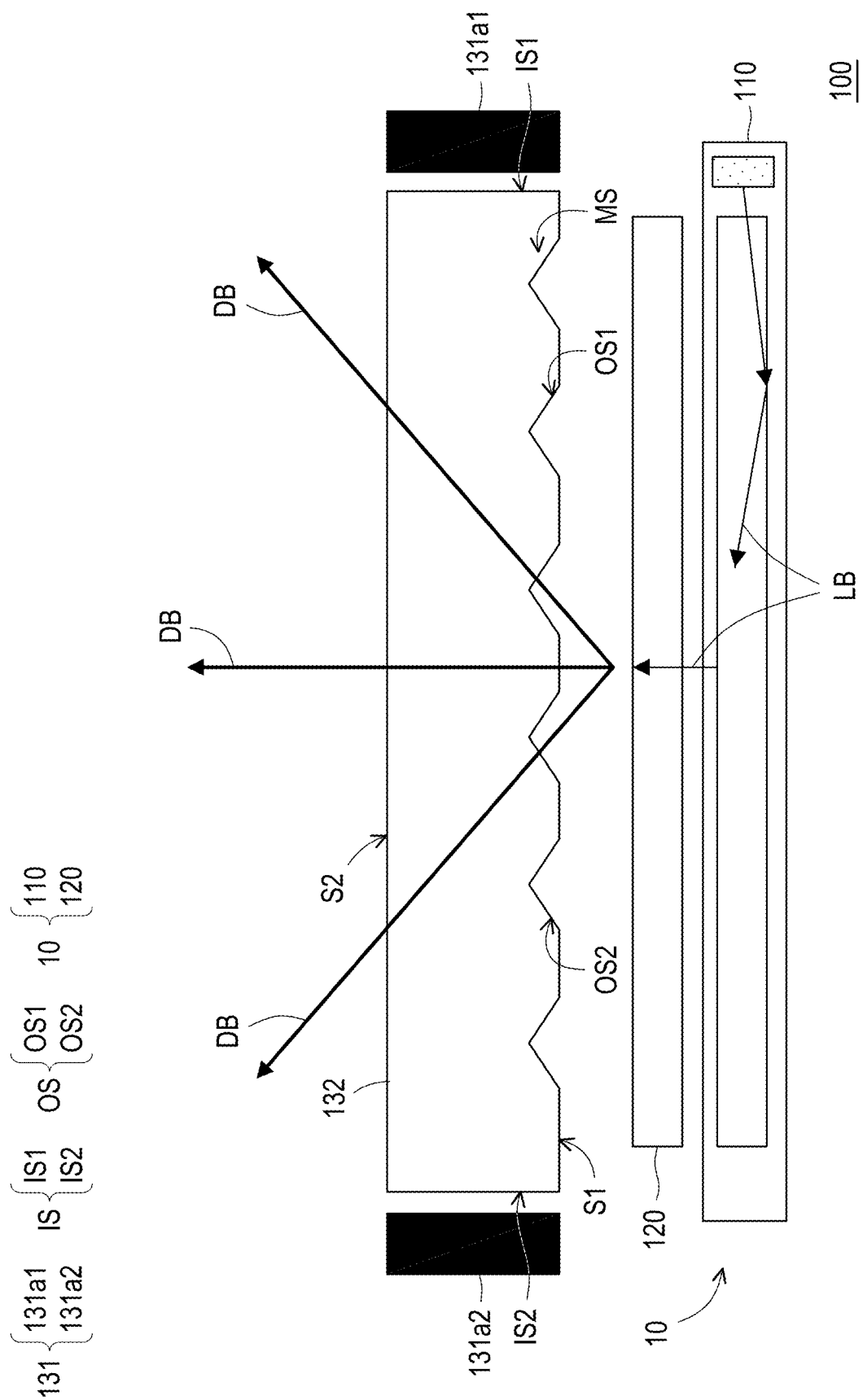
FIG. 1B is a schematic view of a light path of the display device in a normal display mode according to an embodiment of the disclosure.
Figure 1C:
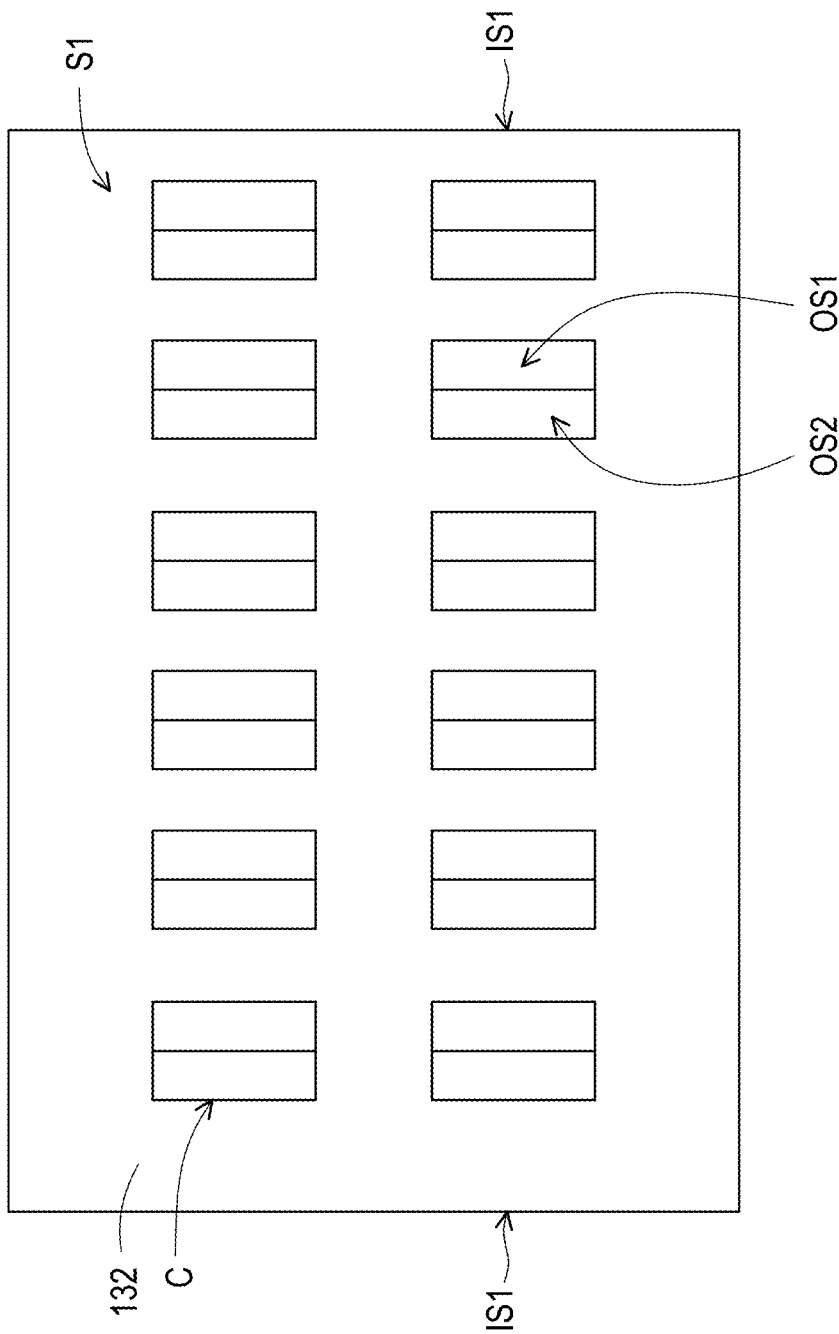
FIG. 1C is a top schematic view of a light guide plate according to an embodiment of the disclosure.
Figure 2A:
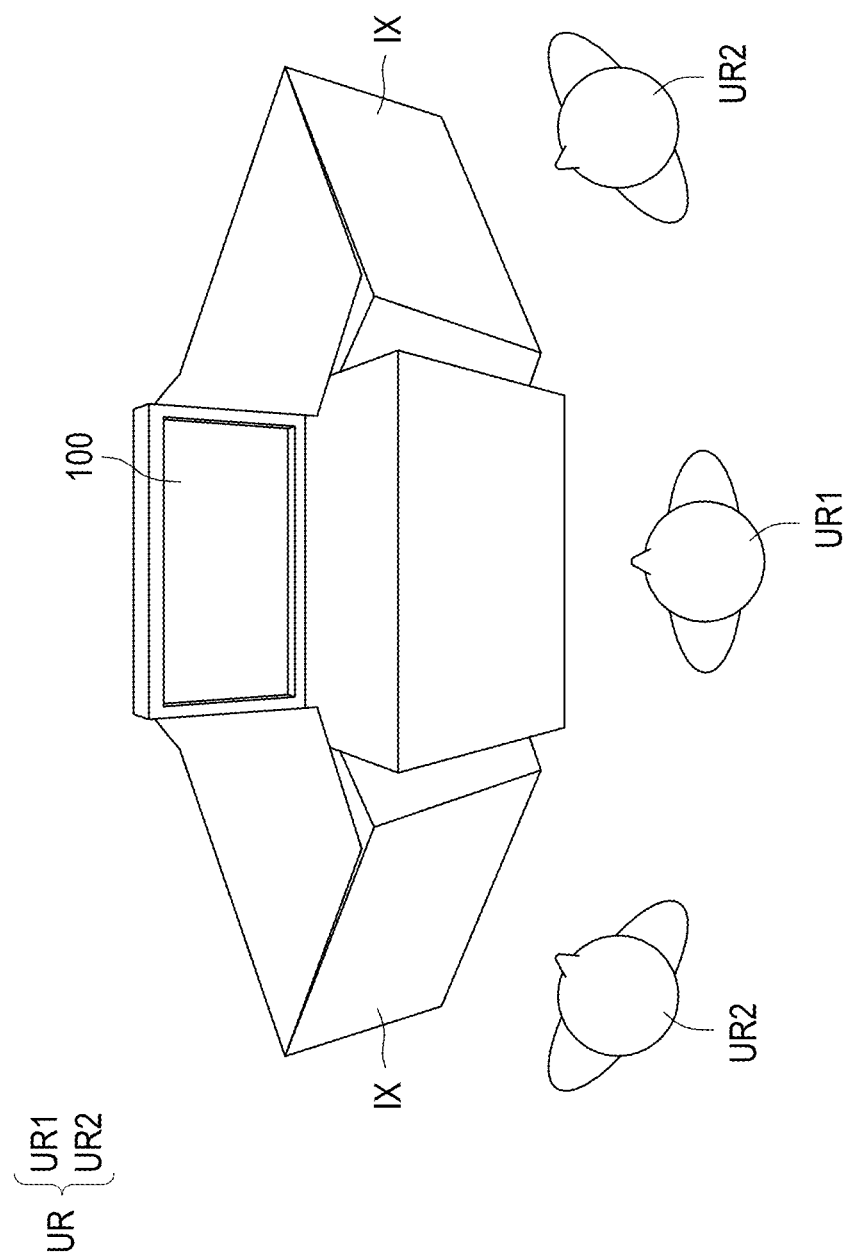
Figure 3A:
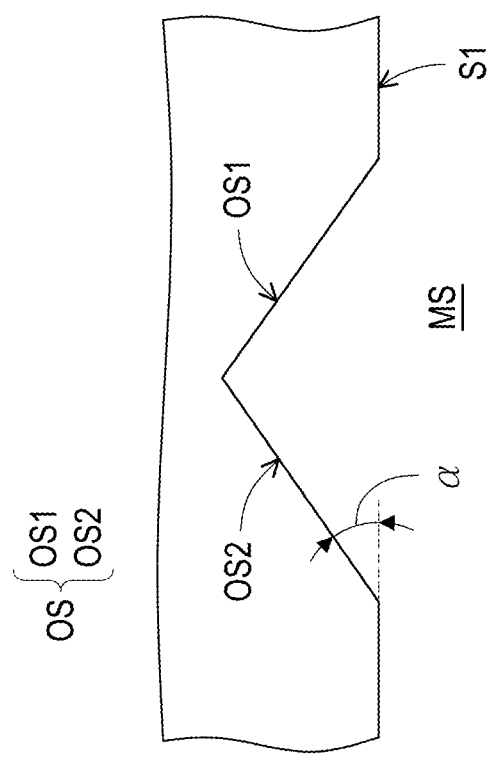
FIG. 3A is a side schematic view of an optical microstructure.
Figure 3B:
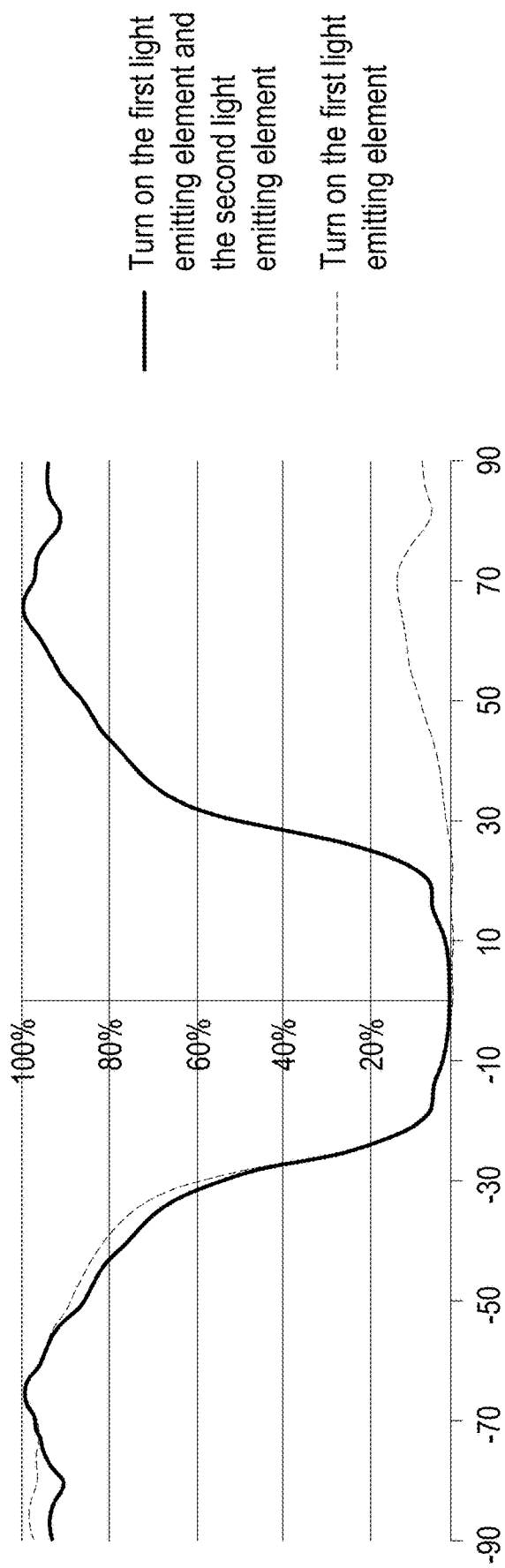
FIG. 3B is a simulation data diagram of a light beam distribution of a peep-proof light source module of FIG. 1A.

FIG. 1A is a schematic view of a light path of a display device in a privacy display mode according to an embodiment of the disclosure. FIG. 1B is a schematic view of a light path of the display device in a normal display mode according to an embodiment of the disclosure. FIG. 1C is a top schematic view of a light guide plate according to an embodiment of the disclosure. FIG. 2A and FIG. 2B are respectively schematic views of viewing scenarios of a user when the display device is in the privacy display mode and the normal display mode. FIG. 3A is a side schematic view of an optical microstructure. FIG. 3B is a simulation data diagram of a light beam distribution of a peep-proof light source module of FIG. 1A. Please refer to FIG. 1A and FIG. 1B. A display device 100 of the embodiment can switch between the privacy display mode and the normal display mode. Specifically, as shown in FIG. 1A and FIG. 1B, in the embodiment, the display device 100 includes a display module 10 and a peep-proof light source module 130. The display module 10 is used to provide a display beam DB. The peep-proof light source module 130 is configured on a transmission path of the display beam DB. For example, in the embodiment, the display module 10 includes a backlight light source module 110 and a display panel 120, wherein the display panel 120 is located between the backlight light source module 110 and the peep-proof light source module 130. The backlight light source module 110 is used to provide an illumination beam LB, the display panel 120 is disposed on the transmission path of the illumination beam LB. The illumination beam LB passes through the display panel 120 to form the display beam DB. In this way, when the display beam DB exits the display device 100, a user UR (shown in FIG. 2A) may view an image displayed by the display device 100. In other embodiments, the display module 10 is, for example, a self-luminous display module, which may directly provide the display beam DB.

Specifically, as shown in FIG. 1A and FIG. 2A, in the embodiment, in the privacy display mode, the display device 100 provides the display beam DB and the privacy light PB at the same time, wherein the privacy light PB can prevent an onlooking user UR2 outside a front viewing angle from peeping the image displayed by the display device 100. In addition, as shown in FIG. 1B and FIG. 2B, in the normal display mode, the display device 100 only provides the display beam DB. Therefore, users UR located at different viewing angles may all view the image displayed by the display device 100. The operation method of how the privacy light PB provides a privacy function in the privacy display mode will be further explained below in conjunction with FIG. 3A to FIG. 3C.

Specifically, as shown in FIG. 1A and FIG. 1B, in the embodiment, the peep-proof light source module 130 includes at least one light emitting element 131, a light guide plate 132, and multiple optical microstructures MS. For example, the light emitting element 131 may be composed of a single light emitting diode (LED). The material of the light guide plate 132 includes polycarbonate (PC), polymethyl methacrylate (PMMA), glass, or other resin materials with high light transmittance.

Specifically, in the embodiment, the at least one light emitting element 131 is used to provide the privacy light PB. For example, as shown in FIG. 1A, in the embodiment, the at least one light emitting element 131 includes a first light emitting element 131a1 and a second light emitting element 131a2, that is, the privacy light PB may include a first privacy light PB1 and a second privacy light PB2, which are respectively provided by the first light emitting element 131a1 and the second light emitting element 131a2.

Specifically, in the embodiment, the light guide plate 132 has at least one light incident surface IS, a first surface S1 and a second surface S2. The first surface S1 and the second surface S2 are opposite to each other, wherein the at least one light incident surface IS is connected to the first surface S1 and the second surface S2, wherein the first surface S1 faces the display panel 120, and the second surface S2 is a light-exiting surface. For example, as shown in FIG. 1A, the at least one light incident surface IS includes a first light incident surface IS1 and a second light incident surface IS2. The first light incident surface IS1 and the second light incident surface IS2 are opposite to each other (the first light incident surface IS1 and the second light incident surface IS are, for example, parallel). The first light emitting element 131a1 faces the first light incident surface IS, and the second light emitting element 131a2 faces the second light incident surface IS2.

Specifically, as shown in FIG. 1A, in the embodiment, the optical microstructures MS are disposed on the first surface S1 of the light guide plate 132, wherein each optical microstructure MS has an optical surface OS. The optical surface OS faces the light incident surface IS. The optical surface OS and the first surface S1 have a connecting line C (shown in FIG. 1C). The connecting line C is, for example, parallel to the light incident surface IS. For example, in the embodiment, the optical microstructure MS is an elongated concave microstructure (as shown in FIG. 3A) and may be formed on the light guide plate 132 by a hot pressing process, which means that the elongated concave microstructure in the embodiment is a structure that is recessed from the first surface S1 toward the inside of the light guide plate 132. The length of the optical microstructure MS (e.g., a length of the connecting line C) is, for example, 100 um. Furthermore, the optical surface OS of each optical microstructure MS is a side surface of the elongated concave microstructure and includes a first optical surface OS1 and a second optical surface OS2, wherein the first optical surface OS1 faces the first light incident surface IS1, the second optical surface OS2 faces the second light incident surface IS2, the first optical surface OS1 is located between the second optical surface OS2 and the first light incident surface IS1, each of the first optical surface OS1 and the second optical surface OS2 is, for example, a light transmitting surface, the first optical surface OS1 is connected between the second optical surface OS2 and the first surface S1, and the second optical surface OS2 is connected between the first optical surface OS1 and the first surface S1. For example, as shown in FIG. 3, in the embodiment, there is a first included angle α (acute angle) between the optical surface OS and the first surface S1 of each optical microstructure MS, and the first included angle α of the optical microstructure MS is a fixed value. The range of the first included angle α is between 10 degrees and 60 degrees. Furthermore, in the embodiment, the first included angle α may preferably be 35 degrees.

Moreover, as shown in FIG. 1A and FIG. 1B, since each optical microstructure MS has the optical surface OS, which is, for example, the light transmitting surface, and no optical film (e.g., reflective layer) is disposed on the optical surface OS, when the display beam DB is transmitted to the optical microstructure MS, only slight refraction will occur, the display beam DB will not be scattered, reflected or greatly attenuated, and the display beam DB can penetrate the optical microstructure MS whether in the privacy display mode or the normal display mode. Therefore, the optical microstructure MS will not affect the display image formed by the display beam DB. In this way, in the embodiment, since the configuration of the optical microstructures MS will not affect the transmission path of the display beam DB, the distribution and positions of the optical microstructures MS may be less restricted and may have a greater design space. For example, in the embodiment, the distribution density of the optical microstructures MS on the first surface S1 of the light guide plate 132 close to the at least one light incident surface IS is substantially the same as the distribution density on the light guide plate 132 away from the at least one light incident surface IS and close to the center. In other words, in the embodiment, the optical microstructures MS reflecting the privacy light PB may be evenly distributed on the first surface S1 (as shown in FIG. 1C, but not limited thereto), so that an image displayed by the display device 100 viewed by the onlooking user UR2 outside the front viewing angle is brightened entirely (e.g., full white image, color washed image) and the content cannot be peeked in the privacy display mode, but the disclosure is not limited thereto.

Furthermore, as shown in FIG. 1A, in the embodiment, the first privacy light PB1 provided by the first light emitting element 131a1 enters the light guide plate 132 through the first light incident surface IS1. The second privacy light PB2 provided by the second light emitting element 131a2 enters the light guide plate 132 through the second light incident surface IS2. Moreover, at least part of the first privacy light PB1 is completely reflected (e.g., total internal reflection) by the first optical surface OS1 of the optical microstructure MS and then exits the light guide plate 132. At least part of the second privacy light PB2 is completely reflected (e.g., total internal reflection) by the second optical surface OS2 and then exits the light guide plate 132. In other words, at least part of the privacy light PB suffers total internal reflection at the optical surface OS and then exits the light guide plate 132.

Furthermore, as shown in FIG. 1A and FIG. 3B, on the light-exiting surface, if the normal direction of the light-exiting surface is 0 degrees, pointing to the second light incident surface IS2 is −90 degrees, and pointing to the first light incident surface IS1 is 90 degrees (that is, a horizontal viewing angle), a light-exiting angle of the first privacy light PB1 exiting the light guide plate 132 is between −20 degrees and −90 degrees, and a light-exiting angle of the second privacy light PB2 exiting the light guide plate 132 is between 20 degrees and 90 degrees. Here, the light-exiting angle is an included angle between a transmission direction of the privacy light PB and the normal of the light-exiting surface (the second surface S2).

In other words, as shown in FIG. 3B, in the embodiment, in the display device 100, on the light-exiting surface, the light-exiting angle of the second privacy light PB2 exiting the light guide plate 132 is between 20 degrees and 90 degrees. Moreover, the luminous flux of the second privacy light PB2 whose light-exiting angle is between 30 degrees and 90 degrees accounts for more than 50% of the total luminous flux of the second privacy light PB2 exiting the light guide plate 132. In this way, as shown in FIG. 1A and FIG. 2A, in the privacy display mode, the onlooking user UR2 viewing the display image at a large viewing angle will see the display beam DB with a large viewing angle and one of the first privacy light PB1 or the second privacy light PB2 at the same time. For example, in the privacy display mode, the luminous flux of the second privacy light PB2 exiting the light guide plate 132 at a light-exiting angle of 30 degrees is more than twice the luminous flux of the display beam DB at a light-exiting angle of 30 degrees. In this way, as shown in FIG. 2A, the onlooking user UR2 will see a color washed image IX (e.g., white image) due to the privacy light PB with high brightness, which can achieve the privacy function. Moreover, since the light-exiting angle of the privacy light PB does not include the front viewing angle (for example, 0 degrees), the viewing quality of the user UR1 viewing the display image in a front viewing region (for example, the horizontal viewing angle ranging from −20 degrees to 20 degrees) is not affected. In this way, the display device 100 can not only provide the privacy function, but also provide good image quality for the user UR1 viewing from the front viewing region.

On the other hand, as shown in FIG. 1B and FIG. 2B, in the normal display mode, the display device 100 only provides the display beam DB. At this time, without the interference of the privacy light PB with high brightness, the users UR located at different viewing angles may all view the image displayed by the display device 100 normally.

Moreover, as shown in FIG. 1A and FIG. 3B, the first privacy light PB1 and the second privacy light PB2 may be generated by independently controlling the first light emitting element 131a1 and the second light emitting element 131a2. Therefore, in the privacy display mode, when there is an onlooker on only one side (left side or right side) near the user UR1 viewing the display image, the first light emitting element 131a1 and the second light emitting element 131a2 may be selectively turned only one of them on depending on the situation, and the privacy function can also be achieved when only the first privacy protection beam PB1 or the second privacy protection beam PB2 is provided.

In addition, in the foregoing embodiment, the optical microstructure MS is exemplified by the optical microstructure whose first included angle α is a fixed value, that is, each of the first optical surface OS1 and the second optical surface OS2 is a plane, but the disclosure is not limited thereto. In other embodiments, the optical microstructure MS may also have other contour shapes, and the first included angle may also change gradually. The following will be further explained in conjunction with FIG. 4A to FIG. 6.

Figure 4B:
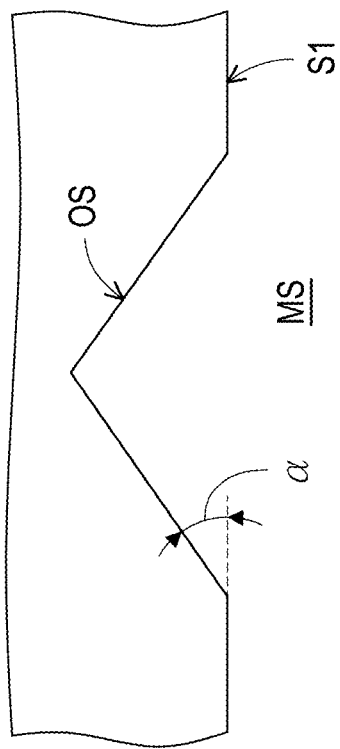
FIG. 4B is a side schematic view of another optical microstructure of FIG. 4A.
Figure 4A:
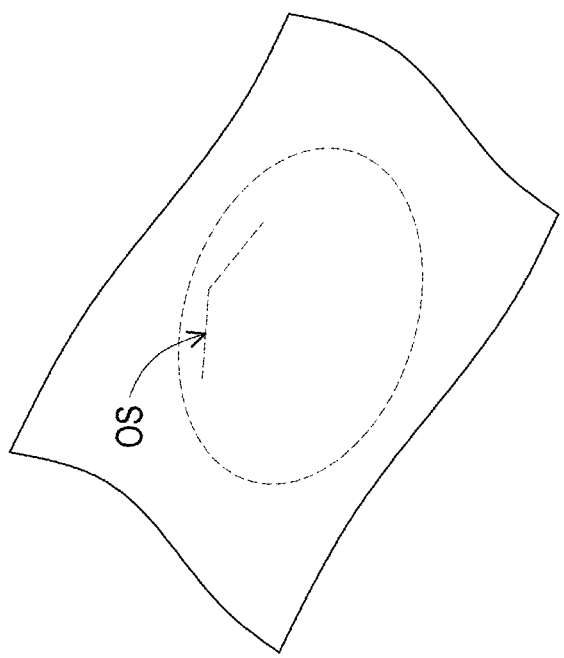
FIG. 4A is a three-dimensional schematic view of another optical microstructure of FIG. 1A.
Figure 6:
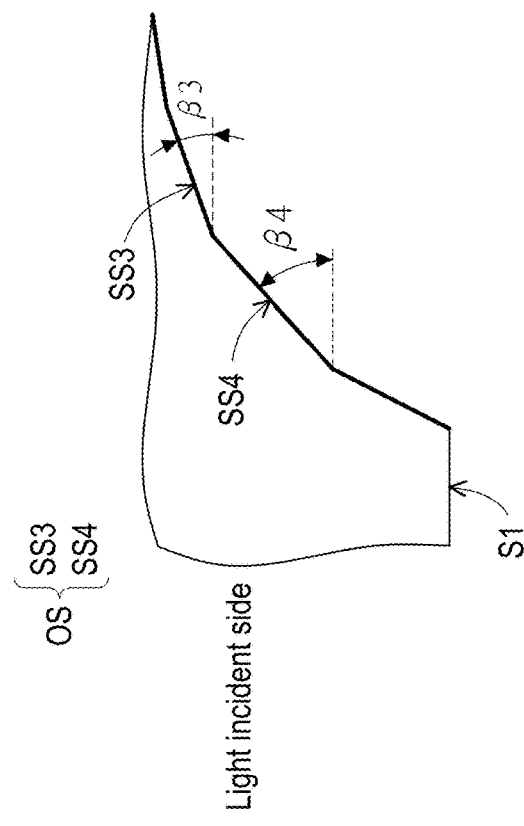
FIG. 5 and FIG. 6 are three-dimensional schematic views of different optical microstructures of FIG. 1A.
Figure 5:
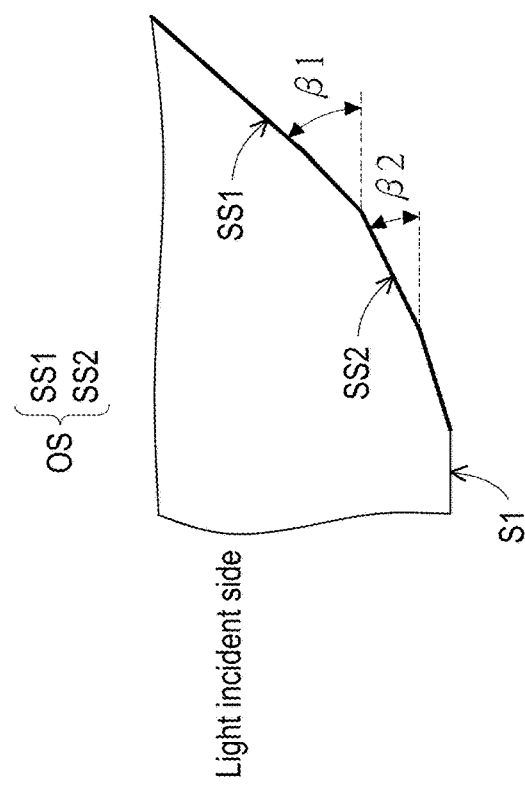

FIG. 4A is a three-dimensional schematic view of another optical microstructure of FIG. 1A. FIG. 4B is a side schematic view of another optical microstructure of FIG. 4A. FIG. 5 and FIG. 6 are three-dimensional schematic views of different optical microstructures of FIG. 1A. Specifically, in the embodiment of FIG. 4A to FIG. 6, the parameter settings of the optical microstructures MS are similar to the parameter settings of the optical microstructures MS of FIG. 3A and FIG. 3B, and the difference is as follows.

As shown in FIG. 4A and FIG. 4B, in the embodiment, the optical microstructure MS is a concave conical microstructure, wherein the optical surface OS is a conical surface of the concave conical microstructure, but the disclosure is not limited thereto. In other embodiments, the optical microstructure MS may be an elongated convex microstructure or a convex conical microstructure. On the other hand, as shown in FIG. 5 and FIG. 6, in the embodiments, the optical surface OS (for example, the first optical surface OS1 or the second optical surface OS2) of each optical microstructure MS includes multiple sub-optical surfaces, and there is a first sub-included angle between each sub-optical surface and the first surface S1. In detail, in the embodiment of FIG. 5, the optical surface OS (for example, the second optical surface OS2) includes sub-optical surfaces SS1 and SS2. There are first sub-included angles β1 and β2 respectively between the sub-optical surfaces SS1 and SS2 and the first surface S1. In the first sub-included angles β1 and β2, the first sub-included angle β1 of the sub-optical surface SS1 further from the first surface S1 is greater than the first sub-included angle β2 of the sub-optical surface SS2 closer to the first surface S1. In other words, the value of each of the first sub-included angles between each of the sub-optical surfaces SS1, SS2 and the first surface S1 increases as the distance from the first surface S1 increases. In the embodiment of FIG. 6, the optical surface OS (for example, the second optical surface OS2) includes sub-optical surfaces SS3 and SS4. There are first sub-included angles β3 and β4 respectively between the sub-optical surfaces SS3 and SS4 and the first surface S1. In the first included angles β3 and β4, the first sub-included angle β3 of the sub-optical surface SS3 further from the first surface S1 is less than the first sub-included angle β4 of the sub-optical surface SS4 closer to the at least one light incident surface IS. In other words, the value of each of the first sub-included angles between each of the sub-optical surfaces SS3, SS4 and the first surface S1 decreases as the distance from the first surface S1 increases. In addition, in the embodiment of FIG. 5 and FIG. 6, since the angles of the included angles between the sub-optical surfaces SS1 and SS2 (SS3 and SS4) gradually change, the change of the angles between the sub-optical surfaces SS1 and SS2 (SS3 and SS4) can be controlled to decrease, which may be beneficial to the hot pressing and molding process of the optical microstructures MS, so as to facilitate manufacturing.

In this way, when the optical microstructures MS of FIG. 4A to FIG. 6 are applied to the embodiment of FIG. 1A, by the configuration of the optical surface OS, at least part of the privacy light PB can also suffer total internal reflection at the optical surface OS and then exit the light guide plate 132 at a large viewing angle. In this way, the display device 100 may also provide the privacy function and provide good image quality for the user UR1 viewing from the front viewing angle, so as to have the aforementioned advantages, which will not be repeated here.

Figure 7:
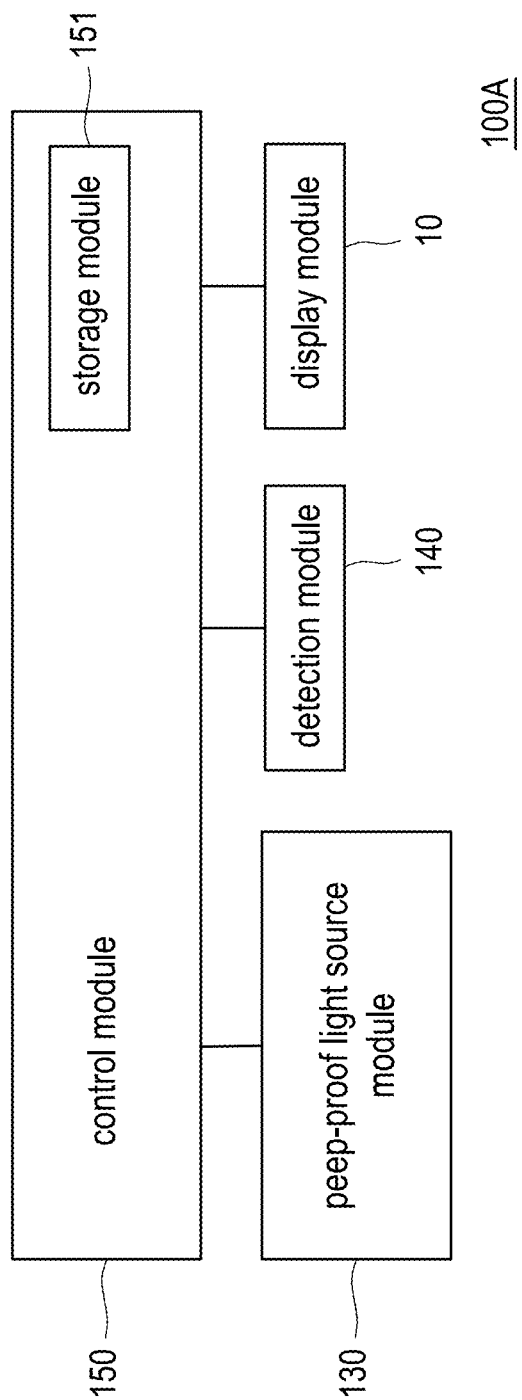
FIG. 7 is a block schematic view of a control module of a display device.

FIG. 7 is a block schematic view of a control module of a display device. In addition, in the embodiment, a display device 100A can not only turn on the privacy display mode manually by the user UR1, by also turn on the privacy display mode automatically through the configuration of a functional module. As shown in FIG. 7, the display device 100A further includes a detection module 140 and a control module 150, so that the display device 100A may automatically turn on the privacy function. For example, as shown in FIG. 7, in the embodiment, the detection module 140 is used to detect whether there is a person in front of the display device 100A. The control module 150 is electrically connected to the privacy light source module 130 and the detection module 140. In addition, the control module 150 may also be provided with a storage module 151 and built with a default user group database including default user group data. When the detection module 140 detects that there is a person in front of the display device 100A, the control module 150 judges whether the person is someone in the default user group. When the judgment is no, the control module 150 controls the at least one light emitting element of the privacy light source module 130 to be turned on, so that the display device 100A switches to the privacy display mode.

In addition, in another embodiment of the disclosure, various arrangement directions of the microstructures relative to the light source may also be used to achieve the effect of making light to exit at a large viewing angle. The following will be further explained in conjunction with FIG. 8 and FIG. 9.

Figure 8:
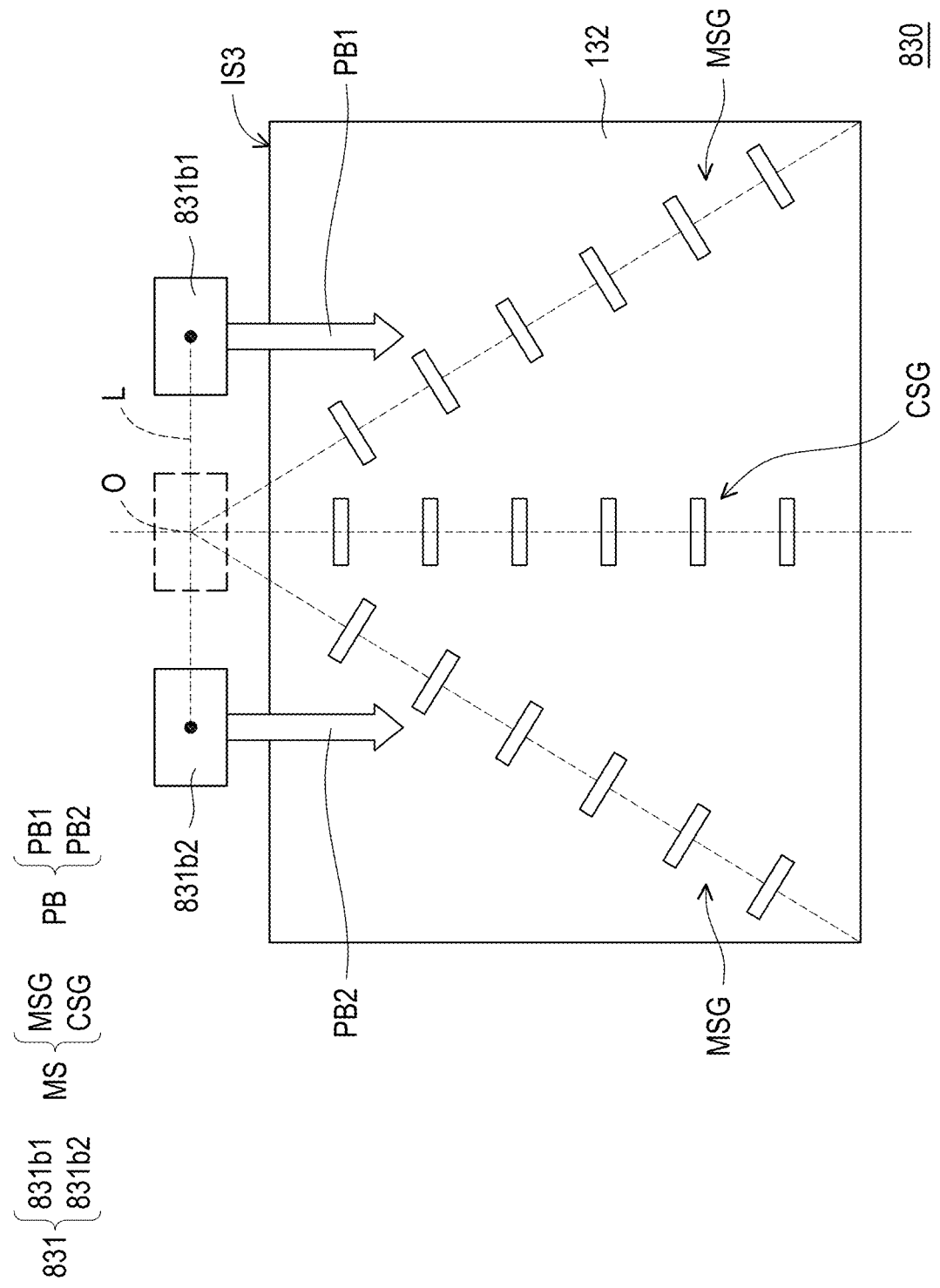
FIG. 8 is a top schematic view of another peep-proof light source module of FIG. 1A.

FIG. 8 is a top schematic view of another privacy light source module of FIG. 1A. FIG. 9 is a schematic view of the privacy light source module of FIG. 8 when a privacy function is enabled. Please refer to FIG. 8 and FIG. 9. A privacy light source module 830 of the embodiment is similar to the privacy light source module 130 of FIG. 1A, and the difference is as follows. In the embodiment, at least one light emitting element 831 includes a first sub-light emitting element 831b1 and a second sub-light emitting element 831b2, and the first sub-light emitting element 831b1 and the second sub-light emitting element 831b2 are located on the same side of the light guide plate 132 (that is, light incident surface IS3). In addition, the optical microstructures MS may be divided into multiple optical microstructure groups MSG and a central column optical microstructure CSG. The optical surface of each optical microstructure MS has a connecting line with the first surface S1. The included angles between the connecting lines of the optical microstructures MS in the same optical microstructure group MSG and the light incident surface IS3 are, for example, the same, and the connecting line of each optical microstructure MS in each optical microstructure group MSG is, for example, not parallel to the light incident surface IS3. The connecting line of each optical microstructure MS in the central column optical microstructure CSG is, for example, parallel to the light incident surface IS3. The arrangement directions of the optical microstructure groups MSG are different. The perpendicular bisector of each optical microstructure group MSG (for example, the perpendicular bisector of the connecting line of the optical microstructure MS) intersects at a reference point O. The positions of the reference point O and the light emitting element 831 do not overlap.

Furthermore, as shown in FIG. 8, in the embodiment, the reference point O is located at the midpoint of a connecting line L of the first sub-light emitting element 831b1 and the second sub-light emitting element 831b2. In addition, the optical microstructure groups MSG are arranged radially with the reference point O as the center. Furthermore, in the embodiment, the optical microstructures MS are arranged with the perpendicular bisector of the central column optical microstructure CSG as the symmetry axis. The first sub-light emitting element 831b1 and the second sub-light emitting element 831b2 deviate from the reference point O and are symmetrically respectively located on two sides of the reference point O, and the perpendicular bisector of the connecting line L of the first sub-light emitting element 831b1 and the second sub-light emitting element 831b2 coincides with the perpendicular bisector of the central column optical microstructure CSG.

In this way, when the privacy light PB1 and the privacy light PB2 respectively provided by the first sub-light emitting element 831b1 and the second sub-light emitting element 831b2 are transmitted to the optical surface of each optical microstructure MS of the optical microstructure groups MSG and the central column optical microstructure CSG, the incidence angles are different depending on the relative positions between a light source position and the optical microstructure MS, and moreover, based on the difference of the incident angle, the light exit angle will also change accordingly. For example, as shown in FIG. 8 and FIG. 9, in the embodiment, when the traveling direction of the privacy light PB1 is not along the perpendicular bisector of each optical microstructure MS to be incident onto the optical surface of the optical microstructure MS, as long as the travelling direction of the privacy light PB1 deviates from the perpendicular bisector of the optical microstructure MS, as the angle of deviation (included angle) increases, the privacy light PB1 will be reflected and exit in a large viewing angle direction on one side of the light guide plate 132 (for example, the right side of the light guide plate 132) relative to the perpendicular bisector of the connecting line L. In this way, through adjusting the relative relationship of the included angle between the arrangement directions of the optical microstructures MS and the position of the light source, the light-exiting angle of the privacy light PB1 exiting the light guide plate 132 may be adjusted. The transmission of the privacy light PB2 in the light guide plate 132 is similar to the transmission of the privacy light PB1, which will not be repeated here.

In this way, when the privacy light source module 830 of FIG. 8 is applied to the embodiment of FIG. 1A, through adjusting the relative relationship of the included angle between the arrangement directions of the optical microstructure groups MSG and the position of the light source, at least part of the privacy light PB suffers total internal reflection at by the optical surface OS and then exit the light guide plate 132 at a large viewing angle. In this way, the display device 100 may also provide the privacy function and provide good image quality for the user UR1 viewing from the front viewing angle, so as to have the aforementioned advantages, which will not be repeated here.

In summary, the embodiments of the disclosure have at least one of the following advantages or effects. In the embodiments of the disclosure, through the configuration of the optical microstructures of the peep-proof light source module, the display device in the privacy display mode can enable at least part of the privacy light to suffer total internal reflection at the optical surface and then exit the light guide plate at a large viewing angle, so that the onlooking user will see an approximately all white image due to the presence of the privacy light with high brightness, which can achieve the privacy function. In addition, since the light-exiting angle of the privacy light does not include the front viewing angle (in the direction overlapping with the normal perpendicular to the light-exiting surface), the viewing quality of the user viewing the display image from the front viewing angle is not affected. In this way, the display device can not only provide the privacy function, but also provide good image quality for the user viewing from the front viewing angle.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, capable of switching between a privacy display mode and a normal display mode, the display device comprising:
   a display module, used to provide a display beam; and
   a peep-proof light source module, configured on a transmission path of the display beam and comprising:
      at least one light emitting element, used to provide a privacy light;
      a light guide plate, having at least one light incident surface and a first surface and a second surface opposite to each other, wherein the at least one light incident surface connects the first surface and the second surface; and
      a plurality of optical microstructures, disposed on the first surface, wherein each of the optical microstructures has an optical surface, the optical surface faces the light incident surface, at least part of the privacy light is reflected by the optical surface and then exits the light guide plate, a distribution density of the optical microstructures on the light guide plate close to the at least one light incident surface is substantially same as a distribution density on the light guide plate away from the at least one light incident surface and close to a center, there is a first included angle between the optical surface of each of the optical microstructures and the first surface, and a range of the first included angle is between 10 degrees and 60 degrees.

2. The display device according to claim 1, wherein the optical surface of each of the optical microstructures comprises a plurality of sub-optical surfaces, there is a first sub-included angle between each of the sub-optical surfaces and the first surface, and in the first sub-included angle of each of the sub-optical surfaces, the first sub-included angle of the sub-optical surface further from the first surface is greater than the first sub-included angle of the sub-optical surface closer to the first surface.

3. The display device according to claim 1, wherein the optical microstructures are elongated concave microstructures, concave conical microstructures, elongated convex microstructures, or convex conical microstructures.

4. The display device according to claim 1, wherein the at least one light emitting element comprises a first light emitting element and a second light emitting element, the privacy light comprises a first privacy light and a second privacy light respectively provided by the first light emitting element and the second light emitting element, the at least one light incident surface comprises a first light incident surface and a second light incident surface, the first light incident surface and the second light incident surface are opposite to each other, the first privacy light enters the light guide plate through the first light incident surface, and the second privacy light enters the light guide plate through the second light incident surface.

5. The display device according to claim 4, wherein the optical microstructures are elongated concave microstructures, the optical surface of each of the optical microstructures comprises a first optical surface and a second optical surface, the first optical surface faces the first light incident surface, at least part of the first anti-peep beam is reflected by the first optical surface and then exits, the second optical surface faces the second light incident surface, and at least part of the second privacy light is reflected by the second optical surface and then exits.

6. The display device according to claim 5, wherein the first privacy light and the second privacy light respectively exit from two sides of a normal of a light-exiting surface of the light guide plate, and on the light-exiting surface, a light-exiting angle of the first privacy light exiting the light guide plate is between −20 degrees and −90 degrees, and a light-exiting angle of the second privacy light exiting the light guide plate is between 20 degrees and 90 degrees.

7. The display device according to claim 1, wherein in the privacy display mode, the display device provides the display beam and the privacy light at a same time, and in the normal display mode, the display device only provides the display beam, wherein in the privacy display mode, a luminous flux of the privacy light exiting the light guide plate at a light-exiting angle of 30 degrees is more than twice a luminous flux of the display beam at a light-exiting angle of 30 degrees.

8. A display device, capable of switching between a privacy display mode and a normal display mode, the display device comprising:
   a display module, used to provide a display beam; and
   a peep-proof light source module, configured on a transmission path of the display beam and comprising:
      a plurality of light emitting elements, used to provide a plurality of privacy lights and located on a same side of a light guide plate;
      the light guide plate, having a light incident surface and a first surface and a second surface opposite to each other, wherein the light incident surface connects the first surface and the second surface; and
      a plurality of optical microstructures, disposed on the first surface, wherein each of the optical microstructures has an optical surface, the optical surface faces the light incident surface, and at least part of the privacy light is reflected by the optical surface and then exits the light guide plate.

9. The display device according to claim 8, wherein the optical microstructures comprise a plurality of optical microstructure groups, arrangement directions of the optical microstructure groups are different, a perpendicular bisector of each of the optical microstructure groups intersects at a reference point, and positions of the reference point and the light emitting elements do not overlap.

* * * * *